(12) United States Patent
Kasai et al.

(10) Patent No.: US 12,337,944 B2
(45) Date of Patent: Jun. 24, 2025

(54) OUTBOARD MOTOR

(71) Applicant: YAMAHA HATSUDOKI KABUSHIKI KAISHA, Iwata (JP)

(72) Inventors: Shinya Kasai, Shizuoka (JP); Koichi Nakayama, Shizuoka (JP); Shinya Maekawa, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 502 days.

(21) Appl. No.: 17/969,843

(22) Filed: Oct. 20, 2022

(65) Prior Publication Data

US 2023/0150634 A1 May 18, 2023

(30) Foreign Application Priority Data

Nov. 15, 2021 (JP) ................................. 2021-185988

(51) Int. Cl.
*B63H 20/24* (2006.01)
*B63H 20/28* (2006.01)
*F02B 61/04* (2006.01)

(52) U.S. Cl.
CPC ............. *B63H 20/24* (2013.01); *B63H 20/28* (2013.01); *F02B 61/045* (2013.01)

(58) Field of Classification Search
CPC ........ B63H 20/24; B63H 20/28; F02B 61/045
See application file for complete search history.

(56) References Cited

U.S. PATENT DOCUMENTS

| 5,346,417 A | * | 9/1994 | Isogawa | F01N 3/28 440/89 R |
| 2003/0056502 A1 | * | 3/2003 | Katayama | F01N 13/004 60/314 |
| 2010/0056001 A1 | * | 3/2010 | Konakawa | F01N 3/10 60/299 |
| 2013/0029545 A1 | | 1/2013 | Maekawa et al. | |

FOREIGN PATENT DOCUMENTS

| JP | 07-125691 A | 5/1995 |
| JP | 2005-016526 A | 1/2005 |
| JP | 2012-159062 A | 8/2012 |

* cited by examiner

*Primary Examiner* — Stephen P Avila
(74) *Attorney, Agent, or Firm* — Keating & Bennett, LLP (57) ABSTRACT

An outboard motor includes an engine, a relay exhaust pipe, a downstream exhaust pipe connected to the relay exhaust pipe, and a propeller to be driven by the engine. The engine includes a plurality of cylinders arranged in series along a vertical direction, a plurality of exhaust ports respectively extending from the combustion chambers of the plurality of cylinders in a sideward direction, and an upstream exhaust pipe connected to the plurality of exhaust ports and extending downwardly. A lower end portion of the upstream exhaust pipe is connected to the relay exhaust pipe from above. The upstream exhaust pipe includes an upstream portion located at a higher location than the lower end portion and extending linearly downwardly. The lower end portion is located closer to the combustion chamber than the upstream portion with respect to a left-right direction.

7 Claims, 7 Drawing Sheets

OUTBOARD MOTOR

CROSS REFERENCE TO RELATED APPLICATIONS

This application claims the benefit of priority to Japanese Patent Application No. 2021-185988 filed on Nov. 15, 2021. The entire contents of this application are hereby incorporated herein by reference.

BACKGROUND OF THE INVENTION

1. Field of the Invention

The present invention relates to an outboard motor.

2. Description of the Related Art

An outboard motor disclosed in Japanese Unexamined Patent Publication No. 2005-16526 includes an engine holder in which an exhaust-gas emission passage is formed, an engine installed in an upper portion of the engine holder, a propeller driven by the engine, and an exhaust manifold. The engine includes a cylinder block in which a plurality of cylinders arranged in series along a vertical direction are formed and a cylinder head connected to the cylinder block from the rear. A plurality of combustion chambers that respectively correspond to the plurality of cylinders and an exhaust port connected to each of the combustion chambers are formed in the cylinder head. The exhaust manifold is located so as to straddle between a side surface of the cylinder head and a side surface of the engine holder. An exhaust passage that connects each of the exhaust ports of the cylinder block and the exhaust-gas emission passage of the engine holder together is formed in the exhaust manifold. The exhaust passage extends from each of the exhaust ports, is gathered in the exhaust manifold, and is connected to the exhaust-gas emission passage. Exhaust gases generated in each of the combustion chambers in accordance with the operation of the engine flow through the corresponding exhaust port, the exhaust passage, and the exhaust-gas emission passage, and then are discharged outwardly from the outboard motor.

SUMMARY OF THE INVENTION

The inventor of preferred embodiments of the present invention described and claimed in the present application conducted an extensive study and research regarding an outboard motor, such as the one described above, and in doing so, discovered and first recognized new unique challenges and previously unrecognized possibilities for improvements as described in greater detail below.

In the outboard motor disclosed in Japanese Unexamined Patent Publication No. 2005-16526, a lower end portion of the exhaust passage in the exhaust manifold is bent, and is connected to the exhaust-gas emission passage of the engine holder from the lateral side because of the structure of the exhaust manifold located so as to straddle between the side surface of the cylinder head and the side surface of the engine holder. In this case, exhaust gas that has flowed downwardly through the exhaust passage and reached the lower end portion of the exhaust passage flow into the exhaust-gas emission passage, and thus is required to change its direction so as to be directed toward the lateral side, and therefore there is a possibility that exhaust pressure loss will be increased. An increase in exhaust pressure loss is a factor that degrades engine performance, and therefore it is preferable to reduce or prevent exhaust pressure loss.

Preferred embodiments of the present invention provide outboard motors that each reduce or prevent exhaust pressure loss in an engine.

In order to overcome the previously unrecognized and unsolved challenges described above, a preferred embodiment of the present invention provides an outboard motor that includes an engine, a relay exhaust pipe, a downstream exhaust pipe connected to the relay exhaust pipe, and a propeller to be driven by the engine. The engine includes a plurality of cylinders arranged in series along a vertical direction and each including a combustion chamber, a plurality of exhaust ports respectively extending from the combustion chambers of the plurality of cylinders in a sideward direction, and an upstream exhaust pipe connected to the plurality of exhaust ports and extending downwardly. The upstream exhaust pipe includes a lower end portion and an upstream portion at a higher location than the lower end portion and extending linearly downwardly. The lower end portion of the upstream exhaust pipe is connected to the relay exhaust pipe from above. The lower end portion of the upstream exhaust pipe is located closer to the combustion chamber than the upstream portion of the upstream exhaust pipe with respect to a left-right direction.

With this structural arrangement, in the outboard motor, the propeller is driven when the engine generates a driving force, and therefore the outboard motor generates a thrust. Exhaust gases generated in each of the combustion chambers of the plurality of cylinders arranged in series in the engine flow sideways through a corresponding exhaust port, and then downwardly flow through the upstream exhaust pipe, and then flow through the relay exhaust pipe and through the downstream exhaust pipe in this order, and are discharged outwardly from the outboard motor. In the upstream exhaust pipe, the lower end portion is located closer to the combustion chamber than the upstream portion, and therefore it is possible to locate a connector portion between the lower end portion of the upstream exhaust pipe and the relay exhaust pipe close to the combustion chamber. Thus, it is possible to prevent the connector portion from protruding outwardly from the outboard motor in the left-right direction, thus making it possible to make the outboard motor compact in the left-right direction.

The upstream portion of the upstream exhaust pipe extends linearly downwardly, and therefore air that downwardly flows in the upstream portion is able to reach the lower end portion of the upstream exhaust pipe substantially without changing its direction. Additionally, the lower end portion of the upstream exhaust pipe is connected to the relay exhaust pipe from above, and therefore exhaust gas that has flowed downwardly and reached the lower end portion of the exhaust passage is able to flow into the relay exhaust pipe substantially without changing its direction. This enables exhaust gases from the upstream exhaust pipe to flow smoothly toward the relay exhaust pipe, thus making it possible to reduce or prevent exhaust pressure loss in the engine.

In a preferred embodiment of the present invention, all of the plurality of exhaust ports are connected to the upstream portion of the upstream exhaust pipe.

With this structural arrangement, it is possible to enable exhaust gases generated in all of the combustion chambers to smoothly flow from the upstream exhaust pipe toward the relay exhaust pipe, and therefore it is possible to reduce or prevent exhaust pressure loss in the engine more advantageously.

In a preferred embodiment of the present invention, the engine includes a camshaft operable to intake/exhaust air in the combustion chamber and a cam chain located below the plurality of cylinders to rotate the camshaft. The upstream portion of the upstream exhaust pipe is located at a more sideward location than the cam chain. At least a portion of the lower end portion of the upstream exhaust pipe is located directly under the cam chain.

With this structural arrangement, in the upstream exhaust pipe, it is possible to locate the lower end portion closer to the combustion chamber than the upstream portion.

In a preferred embodiment of the present invention, an inner surface of the upstream portion of the upstream exhaust pipe includes a first region that is farther away from the combustion chamber than a central axis of the upstream exhaust pipe. An inner surface of the lower end portion of the upstream exhaust pipe includes a second region that is farther away from the combustion chamber than the central axis. The first region and the second region are flush or substantially flush with each other.

With this structural arrangement, exhaust gas of the upstream exhaust pipe is able to downwardly flow along the first region of the upstream portion and along the second region of the lower end portion, and thus is able to reach the lower end portion substantially without changing its direction, thus making it possible to reduce or prevent exhaust pressure loss in the engine more advantageously.

In a preferred embodiment of the present invention, the engine includes a cylinder head that includes the plurality of exhaust ports and is integral with the upstream exhaust pipe.

With this structural arrangement, in the cylinder head of the engine, the plurality of exhaust ports are integral with the upstream exhaust pipe, thus making it possible to make the engine compact.

In a preferred embodiment of the present invention, the relay exhaust pipe includes an inner pipe into which the lower end portion of the upstream exhaust pipe is inserted and an outer pipe surrounding the inner pipe. A flow passage in which cooling water flows is defined between the inner pipe and the outer pipe.

With this structural arrangement, a portion, to which the lower end portion of the upstream exhaust pipe is connected, of the relay exhaust pipe includes a dual structure provided by the inner pipe and the outer pipe, and therefore the connector portion between the lower end portion of the upstream exhaust pipe and the relay exhaust pipe are thickened. However, it is possible to prevent the connector portion from protruding outwardly from the outboard motor in the left-right direction by disposing the connector portion close to the combustion chamber as described above, and therefore the outboard motor is able to be compact in the left-right direction even if the relay exhaust pipe having a dual structure is used.

In a preferred embodiment of the present invention, the engine includes an air intake passage connected to the combustion chamber, a crankshaft extending along a vertical direction, and a rotor attached to an upper end portion of the crankshaft so as to rotate together with the crankshaft. The outboard motor further includes a pressure charger to be driven by transmission of rotation of the rotor so as to compress air flowing through the air intake passage.

With this structural arrangement, the rotor is located above the engine, and not below the engine, thus making it possible to secure a space, which is used to locate the lower end portion of the upstream exhaust pipe closer to the combustion chamber than the upstream portion, below the engine.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
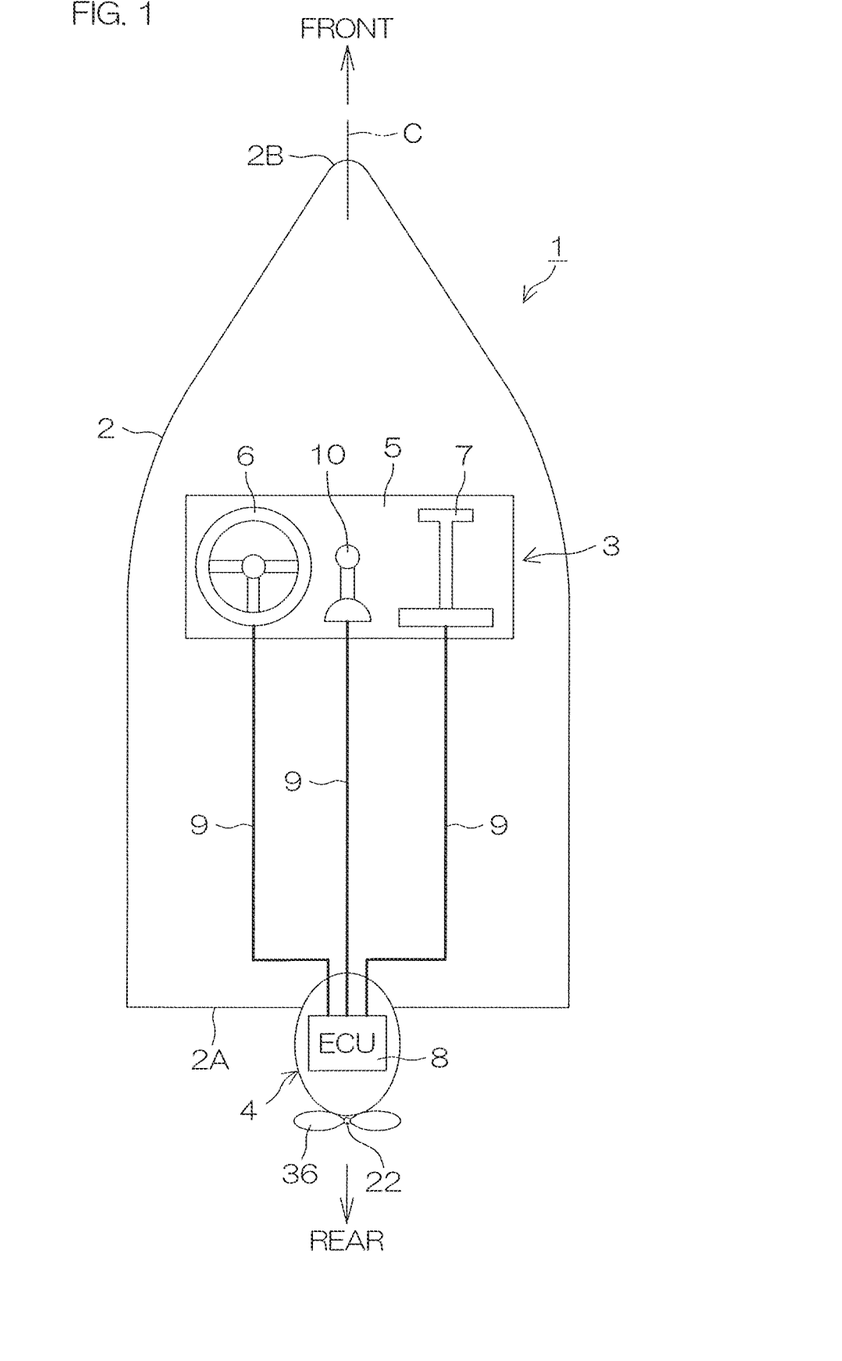
FIG. 1 is a schematic plan view of a vessel according to a preferred embodiment of the present invention.

FIG. 1 is a schematic plan view of a vessel 1 according to a preferred embodiment of the present invention. The vessel 1 includes a hull 2, a vessel operation device 3, and an outboard motor 4, and the hull 2 is equipped with both the vessel operation device 3 and the outboard motor 4. An example of the vessel operation device 3 includes a steering wheel 6 and a throttle lever 7 both of which are provided at an operational platform 5 around a vessel operation seat of the hull 2, and a communication bus 9 by which an ECU (electronic control unit) 8 built into the outboard motor 4, a steering wheel 6, and the throttle lever 7 are connected together. A vessel operator turns the steering wheel 6 in a left-right direction to steer. The vessel operator turns the throttle lever 7 in a front-rear direction to adjust the output of the outboard motor 4. A joystick 10 that is operated by the vessel operator to steer and adjust the output of the outboard motor 4 may be provided at the operational platform 5.

The outboard motor 4 is an example of a vessel propulsion apparatus that provides a thrust to the hull 2, and is provided as a single outboard motor or as a plurality of outboard motors. The single outboard motor 4 is attached to a transom stern 2A on a virtual center line C along the front-rear direction through the transom stern 2A and a bow 2B of the hull 2. The plurality of outboard motors 4 are attached to the transom stern 2A at bilaterally symmetrical positions with respect to the center line C.

Figure 2:
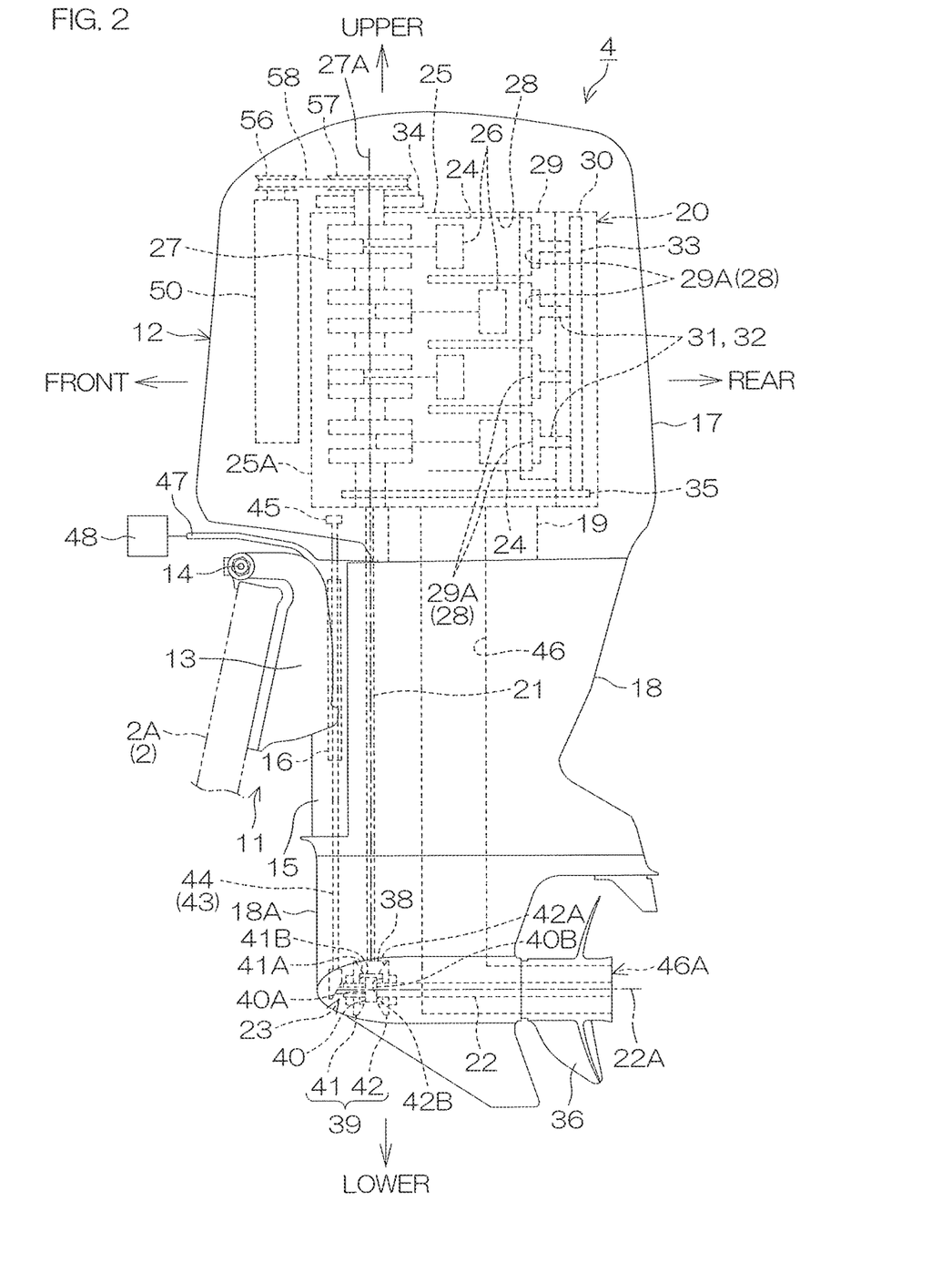
FIG. 2 is a schematic side view of an outboard motor included in the vessel.

FIG. 2 is a schematic right side view of the outboard motor 4. The left side in FIG. 2 is the front side of the outboard motor 4, and the right side in FIG. 2 is the rear side of the outboard motor 4. The upper side in FIG. 2 is the upper side of the outboard motor 4, and the lower side in FIG. 2 is the lower side of the outboard motor 4. An up-down direction is also a vertical direction. A direction perpendicular to the plane of paper of FIG. 2 is the left-right direction of the outboard motor 4. In the following description, a leftward or rightward direction of the outboard motor 4 is determined based on a direction given when the outboard motor 4 is seen from the front side. Therefore, the near side in the direction perpendicular to the plane of paper of FIG. 2 is the right side of the outboard motor 4, and the far side in the direction perpendicular to the plane of paper of FIG. 2 is the left side of the outboard motor 4.

The outboard motor 4 includes a mount 11 to attach the outboard motor 4 to the transom stern 2A and an outboard motor main body 12. The mount 11 includes a clamp bracket 13 fixed to the transom stern 2A and a swivel bracket 15 coupled to the clamp bracket 13 through a tilt shaft 14 horizontally extending in the left-right direction. The swivel bracket 15 is coupled to the outboard motor main body 12 through a steering shaft 16 extending in the up-down direction. Thus, the outboard motor main body 12 is attached to the transom stern 2A by the mount 11 in a vertical or substantial vertical attitude.

The outboard motor main body 12 and the swivel bracket 15 are turnable in the up-down direction around the tilt shaft 14 with respect to the clamp bracket 13. The outboard motor main body 12 is turned around the tilt shaft 14, and, as a result, the outboard motor main body 12 is tilted with respect to the hull 2 and the clamp bracket 13. The outboard motor main body 12 is turnable in the left-right direction together with the steering shaft 16 with respect to the clamp bracket 13 and the swivel bracket 15. When the outboard motor main body 12 turns in the left-right direction, the vessel 1 is steered.

The outboard motor main body 12 includes a box-shaped engine cover 17, a hollow casing 18 extending downwardly from the engine cover 17, and a plate-shaped exhaust guide 19 attached to a lower end portion of the engine cover 17 so as to close an internal space of the casing 18 from above. A lower end portion of the casing 18 is a lower case 18A. The outboard motor main body 12 includes an engine 20 mounted on an upper surface of the exhaust guide 19 in the engine cover 17, a drive shaft 21 extending along the up-down direction in the casing 18, and a propeller shaft 22 and a transmission 23 both of which are located in the lower case 18A.

The engine 20 is a vessel engine, and includes an internal combustion engine that burns fuel, such as gasoline, and generates power. The engine 20 includes a cylinder block 25 including a single or a plurality of cylinders 24, a piston 26 located in the cylinder 24 one by one, and a crankshaft 27 extending along the up-down direction in the cylinder block 25 and that is coupled to the piston(s) 26. The engine 20 in the present preferred embodiment is a straight-type four-cylinder engine in which four cylinders 24 are arranged in series along the up-down direction.

An internal space of each of the cylinders 24 includes a circular cylindrical shape extending along the front-rear direction. A combustion chamber 28 is defined in a region behind the piston 26 in the internal space of each of the cylinders 24. A front portion that houses the crankshaft 27 in the cylinder block 25 is a crank case 25A.

The engine 20 includes a cylinder head 29 attached to the cylinder block 25 from behind and a head cover 30 attached to the cylinder head 29 from behind. The cylinder head 29 and the head cover 30 may be regarded as elements of the cylinder block 25. Concave portions 29A each of which is rearwardly hollowed as a portion of the combustion chamber 28 are provided one by one at a portion, which faces the combustion chamber 28 of each of the cylinders 24, of a front surface of the cylinder head 29. The engine 20 includes an intake valve 31 and an exhaust valve 32 that are exposed to each of the concave portions 29A and a camshaft 33 that extends along the up-down direction and that is rotatably supported by the head cover 30. The camshaft 33 may be provided as a pair of camshafts in accordance with each of the intake valve 31 and the exhaust valve 32.

The crankshaft 27 has a crankshaft axis 27A extending in the up-down direction. An upper end portion of the crankshaft 27 protrudes upwardly from the crank case 25A. A lower end portion of the crankshaft 27 is joined to the upper end portion of the drive shaft 21. The engine 20 includes a flywheel magneto 34 fixed to the upper end portion of the crankshaft 27 and a cam chain 35 connecting the lower end portion of the crankshaft 27 and a lower end portion of the camshaft 33. The flywheel magneto 34 is located at a higher position than the crank case 25A. The cam chain 35 is located below the four cylinders 24 in the cylinder block 25.

The piston 26 is rectilinearly reciprocated in the front-rear direction perpendicular to the crankshaft axis 27A by combustion of an air-fuel mixture in each of the combustion chambers 28. When the piston 26 is rectilinearly reciprocated, the crankshaft 27 is driven and rotated around the crankshaft axis 27A along with the drive shaft 21. In accordance with the rotation of the crankshaft 27, the flywheel magneto 34 rotates and generates electricity, and the cam chain 35 moves in a circular motion. The camshaft 33 is rotated in accordance with the circular movement of the cam chain 35. The intake valve 31 and the exhaust valve 32 are actuated interlockingly with the rotation of the camshaft 33. Thus, intake/exhaust is performed in each of the combustion chambers 28.

The propeller shaft 22 horizontally extends along the front-rear direction in the lower case 18A. A lower end portion of the drive shaft 21 is coupled to a front end portion of the propeller shaft 22 by the transmission 23. A rear end portion of the propeller shaft 22 protrudes rearwardly from the lower case 18A. A propeller 36 as an example of a propulsion unit that is an element of the outboard motor 4 is joined to the rear end portion of the propeller shaft 22. The propeller shaft 22 rotates together with the propeller 36 around a rotational axis 22A that extends in the front-rear direction.

The transmission 23 is used to transmit the rotation of the drive shaft 21 to the propeller shaft 22. The transmission 23 includes a driving gear 38 fixed to the lower end portion of the drive shaft 21 and a rotary body 39 and a dog clutch 40 both of which are attached to the front end portion of the propeller shaft 22. The driving gear 38 is a bevel gear. The propeller shaft 22 is located below the driving gear 38. The rotary body 39 includes a first rotary body 41 and a second rotary body 42 that are located side by side in the front-rear direction along the propeller shaft 22. The first rotary body 41 and the second rotary body 42 are, for example, cylindrical bevel gears, respectively.

In the present preferred embodiment, the first rotary body 41 is located at a more forward position than the driving gear 38, and the second rotary body 42 is located at a more rearward position than the driving gear 38, and yet the front-rear positional relationship between the first rotary body 41 and the second rotary body 42 may be opposite to that of the present preferred embodiment. In a rear surface of the first rotary body 41, a tooth portion 41A is provided at a tapered outer peripheral portion, and a claw portion 41B is provided at an inner peripheral portion. In a front surface of the second rotary body 42, a tooth portion 42A is provided at a tapered outer peripheral portion, and a claw portion 42B is provided at an inner peripheral portion.

The first rotary body 41 surrounds a portion, which is at a more forward position than the driving gear 38, of the front end portion of the propeller shaft 22, and the second rotary body 42 surrounds a portion, which is at a more rearward position than the driving gear 38, of the front end portion of the propeller shaft 22. The first rotary body 41 and the second rotary body 42 are located so that their tooth portions 41A and 42A face each other at a distance from each other in the front-rear direction, and engage with the driving gear 38. When the driving gear 38 rotates together with the drive shaft 21 in response to the driving of the engine 20, the rotation of the driving gear 38 is transmitted to the first rotary body 41 and to the second rotary body 42. Thus, the first rotary body 41 and the second rotary body 42 rotate around the rotational axis 22A of the propeller shaft 22 in mutually opposite directions.

The dog clutch 40 is located between the first rotary body 41 and the second rotary body 42. The dog clutch 40 is, for example, cylindrical, and surrounds the front end portion of the propeller shaft 22. A first claw portion 40A is provided at a front end surface of the dog clutch 40, and a second claw portion 40B is provided at a rear end surface of the dog clutch 40. The dog clutch 40 is coupled to the front end portion of the propeller shaft 22 by, for example, a spline. Therefore, the dog clutch 40 rotates together with the front end portion of the propeller shaft 22. Additionally, the dog clutch 40 is movable in the front-rear direction with respect to the front end portion of the propeller shaft 22. In other words, the dog clutch 40 is rotatable together with the propeller shaft 22, and is movable along the front-rear direction relatively with the propeller shaft 22.

The transmission 23 also includes a shifter 43 located at a more forward position than the propeller shaft 22 in the lower case 18A. The shifter 43 includes, for example, a shift rod 44 extending in the up-down direction and an electric shift actuator 45 joined to the shift rod 44. A lower end portion of the shift rod 44 is coupled to the dog clutch 40. When the shift actuator 45 is operated by the control of the ECU 8 (see FIG. 1), the shift rod 44 turns around an axis of the shift rod 44. The shift rod 44 turns, and, as a result, the dog clutch 40 is moved along the front-rear direction between a disconnection position and a connection position.

The disconnection position is a position in which the dog clutch 40 is spaced apart from the first rotary body 41 and the second rotary body 42, and does not engage with either of these rotary bodies of the rotary body 39 as shown in FIG. 2. In a state in which the dog clutch 40 is located in the disconnection position, each of the rotary body 39 to which the rotation of the drive shaft 21 is transmitted runs idle, and therefore the rotation of the drive shaft 21 is not transmitted to the propeller shaft 22. In the following description, the shift position of the outboard motor 4 at this time is referred to as "neutral."

The connection position is a position in which the dog clutch 40 engages with either one of the first rotary body 41 or the second rotary body 42. The connection position includes a first connection position in which the first claw portion 40A of the dog clutch 40 engages with only the claw portion 41B of the first rotary body 41 and a second connection position in which the second claw portion 40B of the dog clutch 40 engages with only the claw portion 42B of the second rotary body 42. The disconnection position is a position between the first connection position and the second connection position. The first connection position is more forward than the disconnection position, and the second connection position is more rearward than the disconnection position.

In a state in which the dog clutch 40 is located in the first connection position and is coupled to only the first rotary body 41, the rotation of the first rotary body 41 is transmitted to the propeller shaft 22, and therefore the shift position of the outboard motor 4 is shifted into "forward." Thereupon, the rotation of the drive shaft 21 is transmitted to the propeller shaft 22 through the first rotary body 41 and the dog clutch 40, and, as a result, the propeller 36 rotates in a forward rotational direction (for example, a clockwise direction when seen from the rear side). Thus, the propeller 36 is driven by the engine 20, and a forward thrust is generated.

In a state in which the dog clutch 40 is located in the second connection position and is coupled to only the second rotary body 42, the rotation of the second rotary body 42 is transmitted to the propeller shaft 22, and therefore the shift position of the outboard motor 4 is shifted into "reverse." Thereupon, the rotation of the drive shaft 21 is transmitted to the propeller shaft 22 through the second rotary body 42 and the dog clutch 40, and, as a result, the propeller 36 rotates in a reverse rotational direction opposite to the forward rotational direction. Thus, the propeller 36 is driven by the engine 20, and a reverse thrust is generated. As thus described, in the present preferred embodiment, the first rotary body 41 is a gear for forward movement, and the second rotary body 42 is a gear for reverse movement. Of course, the first rotary body 41 may be a gear for reverse movement, and the second rotary body 42 may be a gear for forward movement.

The outboard motor main body 12 includes an exhaust passage 46 provided inside the outboard motor main body 12 and connected to the engine 20. The exhaust passage 46 passes through the exhaust guide 19 in the up-down direction, and extends downwardly in the casing 18 and rearwardly in the propeller 36. The exhaust passage 46 includes an outlet 46A provided at a rear end surface of the propeller 36. In a state in which the vessel 1 is floating on water and in which the propeller 36 is located below a water surface, the outlet 46A is located in the water, and therefore water that has passed through the outlet 46A enters a downstream portion of the exhaust passage 46. On the other hand, when the engine 20 rotates at a high speed, water in the exhaust passage 46 is pushed by the pressure of an exhaust gas emitted from the engine 20, and is discharged from the outlet 46A together with the exhaust gas. Thus, the exhaust gas generated by the engine 20 is discharged into the water.

A steering rod 47 that forwardly extends is fixed to the outboard motor main body 12. An electric steering actuator 48 that is controlled by the ECU 8 is joined to the steering rod 47. The outboard motor main body 12 is able to turn around the steering shaft 16 by allowing the steering actuator 48 to operate, thus making it possible to perform steering.

Figure 3:
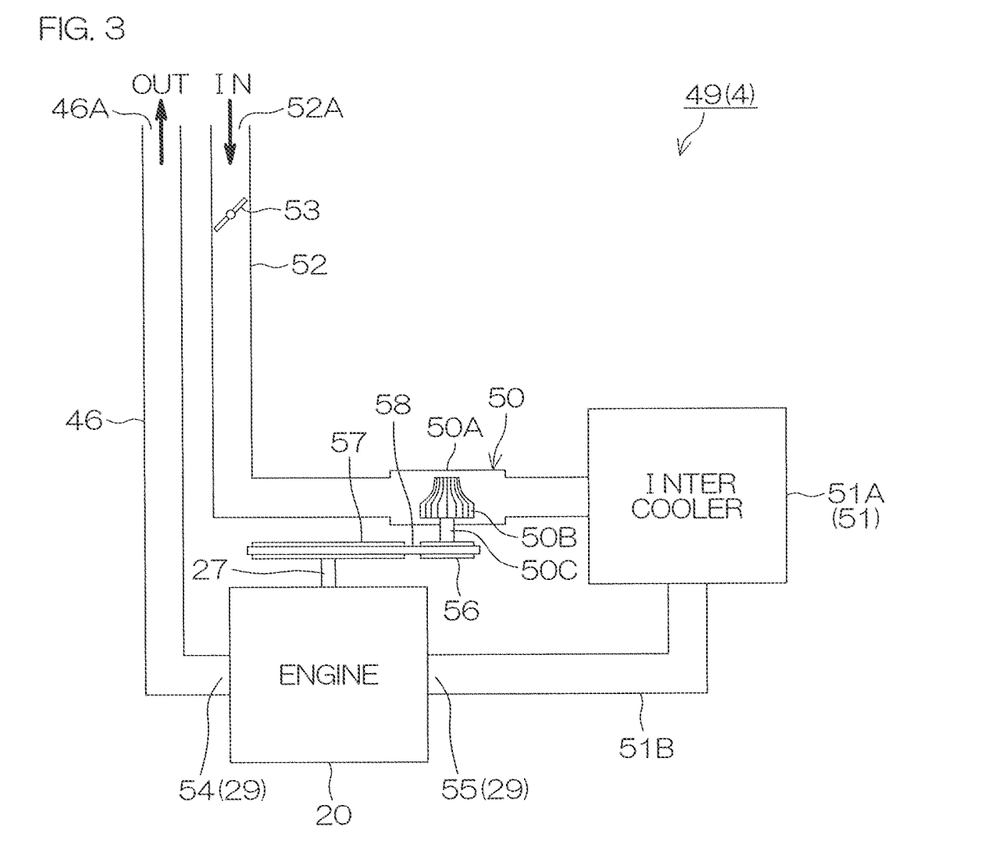
FIG. 3 is a schematic view shown to describe an air intake/exhaust system of the outboard motor.

FIG. 3 is a schematic view shown to describe an air intake/exhaust system 49 of the outboard motor 4. The air intake/exhaust system 49 includes the engine 20, a pressure charger 50 that compresses air and supplies the air to the engine 20, and an intercooler 51 that cools air compressed by the pressure charger 50.

With respect to the air intake/exhaust system 49, the engine 20 includes the exhaust passage 46, an air intake passage 52, and an electric throttle valve 53 located in the air intake passage 52. The exhaust passage 46 is connected to each of the combustion chambers 28 through a plurality of exhaust ports 54 provided in the cylinder head 29 of the engine 20. The air intake passage 52 is connected to each of the combustion chambers 28 through a plurality of intake ports 55 provided in the cylinder head 29. An inlet 52A is provided at an end portion, which is opposite to the intake port 55, of the air intake passage 52. The ECU 8 controls the throttle valve 53, and, as a result, the opening degree of the throttle valve 53 is adjusted.

The pressure charger 50 is interposed between the ends of the air intake passage 52. The pressure charger 50 is a supercharger driven by the rotation of the crankshaft 27 of the engine 20. The pressure charger 50 includes a housing 50A including an internal space defining a portion of the air intake passage 52, a compressor wheel 50B located in the housing 50A, and a rotational shaft 50C coaxially fixed to the compressor wheel 50B. An end portion, which is spaced apart from the compressor wheel 50B, of the rotational shaft 50C is located outside the housing 50A, and a rotor 56 is coaxially fixed to this end portion.

The air intake/exhaust system 49 includes a power transmission by which the crankshaft 27 and the pressure charger 50 are joined together. An example of the power transmission includes the rotor 56, another rotor 57 attached to the crankshaft 27, and a belt 58 by which the rotor 56 and the rotor 57 are connected together. An example of each of the rotors 56 and 57 is a pulley. The rotor 57 is attached to a portion, which is located at a higher position than the flywheel magneto 34, of the upper end portion of the crankshaft 27 (see FIG. 2).

When the crankshaft 27 rotates, the rotor 57 rotates together with the crankshaft 27. The rotation of the rotor 57 is transmitted to the rotor 56 through the belt 58. Thereupon, the rotational shaft 50C rotates together with the compressor wheel 50B, and, as a result, the pressure charger 50 is driven. A sprocket may be used as each of the rotors 56 and 57 instead of the pulley, and a chain may be used instead of the belt 58.

When the pressure charger 50 operates in a state in which the throttle valve 53 has been opened, air that has been taken from the inlet 52A and that flows through the air intake passage 52 is compressed by the compressor wheel 50B rotating in the housing 50A. Another arrangement, such as a Lysholm-type device, may be used as the pressure charger 50 without being limited to the centrifugal-type device shown in FIG. 3.

The intercooler 51 is interposed between each of the intake ports 55 of the engine 20 and the pressure charger 50 in the air intake passage 52. The intercooler 51 includes a housing 51A including an internal space defining a portion of the air intake passage 52 and a cooling fin (not shown). Either of an air-cooled intercooler or a water-cooled intercooler may be used as the intercooler 51. The intercooler 51 includes an intake manifold 51B that extends from the housing 51A and is connected to the intake port 55. The intake manifold 51B is integral with the housing 51A.

Air compressed by the compressor wheel 50B in the housing 50A of the pressure charger 50 continuously flows through the air intake passage 52, and thus is guided to the intercooler 51, and is cooled by heat exchange with the cooling fin in the housing 51A of the intercooler 51. The air cooled by the intercooler 51 flows through the intake manifold 51B, and then is turned into an air-fuel mixture, supplied from the intake port 55 to the combustion chamber 28 in the cylinder 24, and combusted. Exhaust gas generated by the combustion flows from the exhaust port 54 through the exhaust passage 46, and then is discharged from the outlet 46A into the water as described above.

Figure 4:
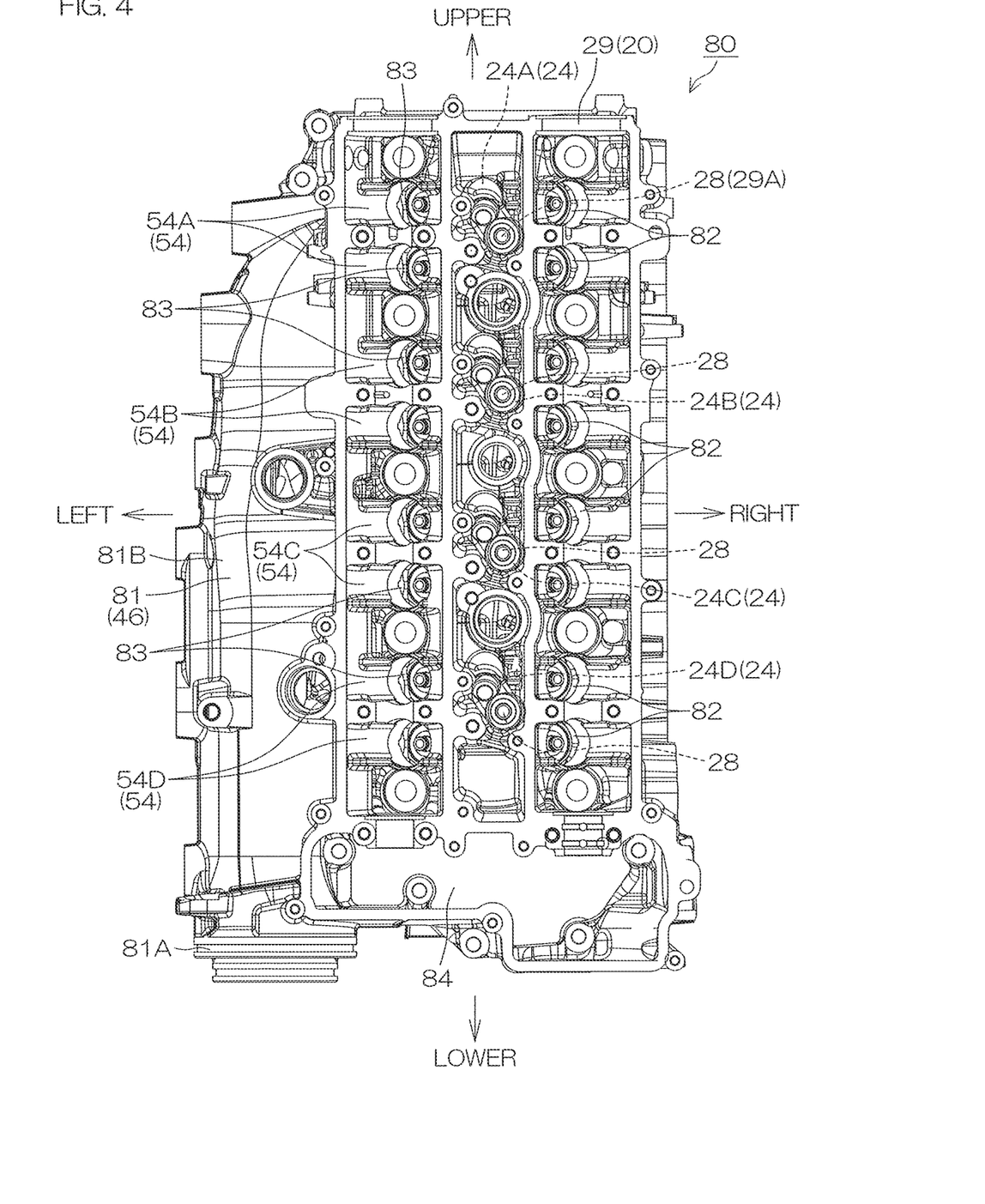
FIG. 4 is a rear view of a main portion of an engine in the outboard motor.

FIG. 4 is a rear view of a main portion of the engine 20 in a state in which the head cover 30 has been detached. FIG. 4 shows an exhaust structure 80 included in the air intake/exhaust system 49 of the engine 20. The exhaust structure 80 includes the exhaust ports 54 and an upstream exhaust pipe 81 located on the left side of these exhaust ports 54. The cylinder head 29 is elongated in the up-down direction so as to straddle the plurality of (in the present preferred embodiment, four) cylinders 24. The cylinder head 29 is provided with the concave portions 29A (a portion of the combustion chamber 28) whose number is equal to that of the cylinders 24.

In the following description, the uppermost cylinder 24 among the four cylinders 24 in the up-down direction will be referred to as a first cylinder 24A if necessary, and the cylinder 24 downward of and next to the first cylinder 24A will be referred to as a second cylinder 24B if necessary. The cylinder 24 downward of and next to the second cylinder 24B will be referred to as a third cylinder 24C if necessary, and the cylinder 24 downward of and next to the third cylinder 24C, i.e., the lowermost cylinder 24 will be referred to as a fourth cylinder 24D if necessary.

Referring to the first cylinder 24A, a pair of intake openings 82 and a pair of exhaust openings 83 are provided in a region, which coincides with the combustion chamber 28 in a rear view, of a rear surface of the cylinder head 29. The intake opening 82 and the exhaust opening 83 are each a round hole that passes through the cylinder head 29 in the front-rear direction or substantially in the front-rear direction. The single intake valve 31 is located at the single intake opening 82, and the single exhaust valve 32 is located at the single exhaust opening 83 (not shown).

For the intake opening 82 and the exhaust opening 83 that correspond to the single combustion chamber 28, the pair of exhaust openings 83 arranged side by side along the up-down direction are located at a more leftward location than the pair of intake openings 82 arranged side by side along the up-down direction. The pair of intake openings 82 and the pair of exhaust openings 83 communicate with the combustion chamber 28 from the rear. The intake port 55 is provided as a plurality of (in the present preferred embodiment, eight) intake ports whose number is equal to that of the intake openings 82, and these intake ports 55 are each, for example, a circular tubular pipe passage, and the single intake port 55 is connected to the single intake opening 82 (not shown).

The exhaust port is, for example, a circular tubular pipe passage, and is provided as a pair of exhaust ports for each cylinder 24, i.e., for each combustion chamber 28 in the cylinder head 29, and eight exhaust ports 54 in total are provided in the present preferred embodiment. Each of these exhaust ports 54 is connected to the single exhaust opening 83. Thus, the plurality of exhaust ports are respectively connected to the plurality of combustion chambers 28, and extend from these combustion chambers 28 in the lateral direction, i.e., more specifically, in the leftward direction. The pair of exhaust ports 54 connected to each of the combustion chambers 28 are arranged side by side in the up-down direction.

In the following description, the pair of exhaust ports 54 connected to the combustion chamber 28 of the first cylinder 24A will be referred to as a pair of first exhaust ports 54A if necessary, and the pair of exhaust ports 54 connected to the combustion chamber 28 of the second cylinder 24B will be referred to as a pair of second exhaust ports 54B if necessary. The pair of exhaust ports 54 connected to the combustion chamber 28 of the third cylinder 24C will be referred to as a pair of third exhaust ports 54C if necessary, and the pair of exhaust ports 54 connected to the combustion chamber 28 of the fourth cylinder 24D will be referred to as a pair of fourth exhaust ports 54D if necessary. The pair of second exhaust ports 54B are located downward of and next to the pair of first exhaust ports 54A, and the pair of third exhaust ports 54C are located downward of and next to the pair of second exhaust ports 54B, and the pair of fourth exhaust ports 54D are located downward of and next to the pair of third exhaust ports 54C.

Figure 5:
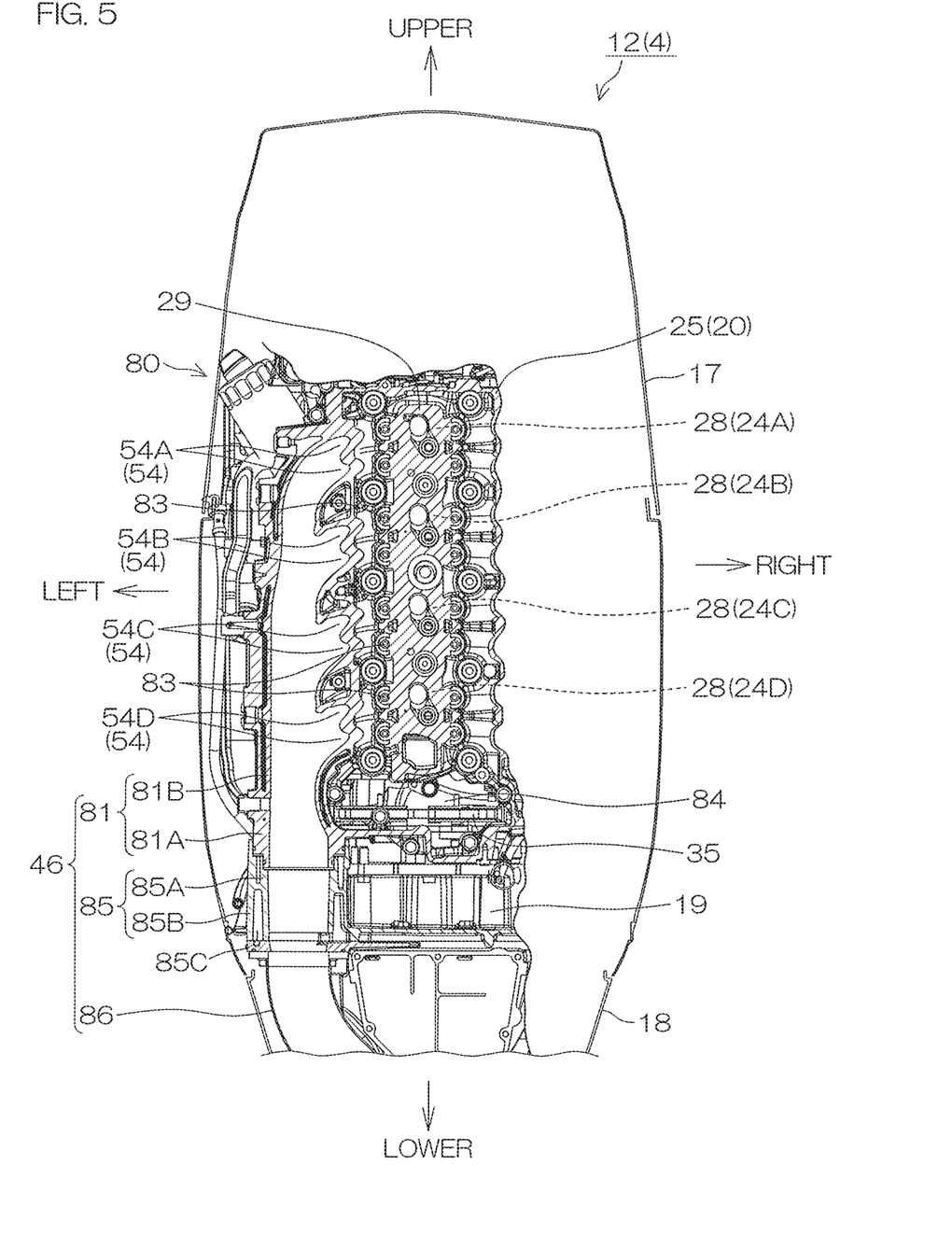
FIG. 5 is a longitudinal sectional rear view of the outboard motor.

A space 84 that is elongated in the left-right direction is provided at a lower end portion, which is located at a more downward location than the combustion chamber 28 of the fourth cylinder 24D, of the cylinder head 29. A portion of the cam chain 35 and lubricating oil for the cam chain 35 are located in the space 84 as shown in FIG. 5 that is a longitudinal sectional rear view of the outboard motor 4. Structures other than the exhaust structure 80 are omitted, and are not shown in FIG. 5. The flywheel magneto 34 is attached to the upper end portion of the crankshaft 27 as described above (see FIG. 2). The flywheel magneto 34 is a heavy device, and thus is required to provide the flywheel magneto 34 at a location as low as possible so as not to generate torsional resonance in the crankshaft 27, and, in accordance with this, the cam chain 35 is located in the space 84 at the lower end portion of the cylinder head 29 in the present preferred embodiment.

Figure 6:
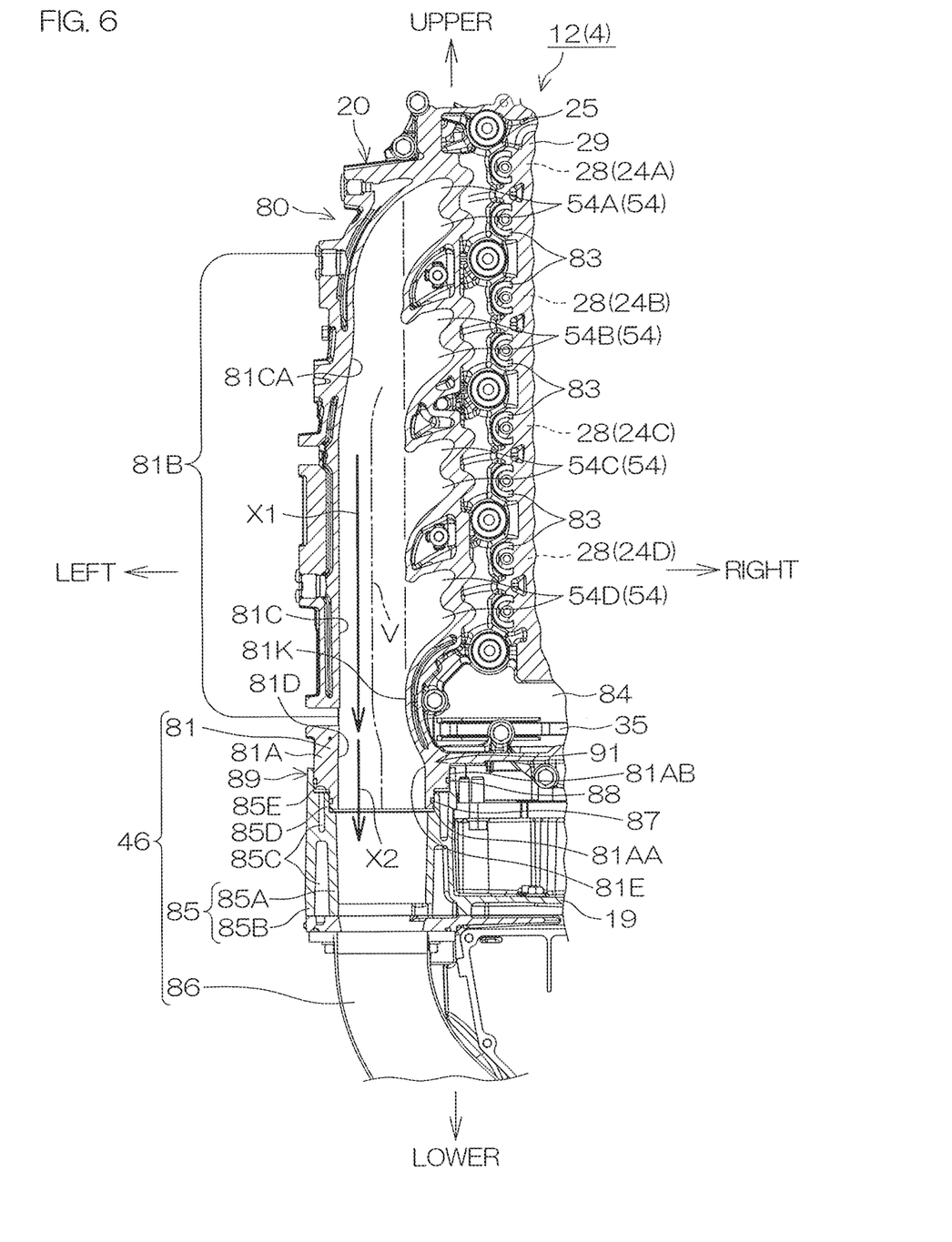
FIG. 6 is an enlarged view in which the main portion has been extracted from FIG. 5.

FIG. 6 is an enlarged view in which the main portion has been extracted from FIG. 5. The upstream exhaust pipe 81 extends downwardly along the up-down direction, and its inner surface has a cylindrical shape (for example, a circular cylindrical shape or a substantially circular cylindrical shape) extending in the up-down direction. The upstream exhaust pipe 81 is integral with each of the exhaust ports 54 of the cylinder head 29. This makes it possible to make the engine 20 compact (particularly in the left-right direction in the present preferred embodiment). In relation to the upstream exhaust pipe 81, the exhaust structure 80 includes a relay exhaust pipe 85 extending in the up-down direction through the exhaust guide 19 supporting the engine 20 from below and a downstream exhaust pipe 86 that is connected to a lower end of the relay exhaust pipe 85 and that extends downwardly. The upstream exhaust pipe 81, the relay exhaust pipe 85, and the downstream exhaust pipe 86 are elements of the exhaust passage 46 discussed above.

The upstream exhaust pipe 81 includes a lower end portion 81A and an upstream portion 81B located at a higher location than the lower end portion 81A. The lower end portion 81A may be an angular cylindrical portion, although the lower end portion 81A is described definitively as a circular cylindrical portion in the following description. The same applies to the upstream portion 81B. The lower end portion 81A is connected to the relay exhaust pipe 85 from above. The relay exhaust pipe 85 includes an inner pipe 85A into which the lower end portion 81A is inserted and an outer pipe 85B surrounding the inner pipe 85A, and is integral with a left end portion of the exhaust guide 19. A flow passage 85C in which cooling water flows is defined between the inner pipe 85A and the outer pipe 85B.

The flow passage 85C includes an inlet (not shown) and an outlet (not shown) that are provided in an outer surface of the casing 18, and extends along the engine 20 as a cooling jacket. A pump (not shown) that operates interlockingly with the rotation of the drive shaft 21 takes in external water from the inlet, and allows the water to flow to the flow passage 85C, and discharges it from the outlet. Water flowing through the flow passage 85C cools the engine 20 as cooling water.

The lower end portion 81A of the upstream exhaust pipe 81 includes a circular cylindrical small diameter portion 81AA defining a lower end of the upstream exhaust pipe 81 and a large diameter portion 81AB larger in diameter than the small diameter portion 81AA. A circular annular first stepped portion 85D is provided at a location slightly lower than an upper end of the inner pipe 85A in an inner peripheral surface of the inner pipe 85A of the relay exhaust pipe 85. An upper end portion of the outer pipe 85B protrudes more upwardly than an upper end portion of the inner pipe 85A. The relay exhaust pipe 85 is provided with a circular annular second stepped portion 85E that extends horizontally from the upper end of the inner pipe 85A and that is connected to the outer pipe 85B.

The small diameter portion 81AA faces the first stepped portion 85D from above in a state of being surrounded by the upper end portion of the inner pipe 85A. The large diameter portion 81AB faces the second stepped portion 85E from above in a state of being surrounded by the upper end portion of the outer pipe 85B. A gap between the small diameter portion 81AA and the upper end portion of the inner pipe 85A is sealed with a sealing member 87, such as an O ring, and a gap between the large diameter portion 81AB and the upper end portion of the outer pipe 85B is sealed with a sealing member 88, such as an O ring. This prevents water flowing through the flow passage 85C from leaking from the gap between the lower end portion 81A and the relay exhaust pipe 85. Note that the inner diameter of a portion, which is at a more downward location than the first stepped portion 85D, of the inner pipe 85A is equal to the inner diameter of the small diameter portion 81AA, i.e., is equal to the inner diameter of the lower end portion 81A of the upstream exhaust pipe 81, or is slightly larger than the inner diameter of the small diameter portion 81AA.

The upstream portion 81B of the upstream exhaust pipe 81 extends linearly downwardly. The pair of first exhaust ports 54A are downwardly curved and are connected to the upper end of the upstream portion 81B from above in a state of having merged together. The pair of second exhaust ports 54B are downwardly curved and are connected to the upstream portion 81B from the right side in a state of having merged together. A downstream portion 54H of the pair of third exhaust ports 54C is downwardly curved and is connected to the upstream portion 81B from the right side in a state of having merged together. The downstream portion 54H of the pair of fourth exhaust ports 54D is downwardly curved and is connected to the upstream portion 81B from the right side in a state of having merged together. In other words, all of the plurality of exhaust ports are connected to the upstream portion 81B. The inner surface of the upstream portion 81B includes an adjacent region 81K which extends in the up-down direction and is located near or adjacent to combustion chamber 28 in the left-right direction.

In the upstream exhaust pipe 81, the upstream portion 81B is at a more leftward location than the cam chain 35 in the space 84 at the lower end portion of the cylinder head 29, and at least a portion of the lower end portion 81A is located directly under the cam chain 35. Therefore, the lower end portion 81A is located about 5 mm to about 10 mm, for example, closer to the combustion chamber 28 than the upstream portion 81B in the left-right direction, i.e., the lower end portion 81A is located at a more rightward location than the upstream portion 81B.

As described above, according to the present preferred embodiment, exhaust gases generated in each of the combustion chambers 28 of the plurality of cylinders 24 arranged in series in the engine 20 leftwardly flow through a corresponding exhaust port 54, and then downwardly flow through the upstream exhaust pipe 81, and then flow through the relay exhaust pipe 85 and through the downstream exhaust pipe 86 in this order, and are discharged from the outlet 46A (see FIG. 2) of the exhaust passage 46, and are discharged outwardly from the outboard motor 4.

Figure 7:
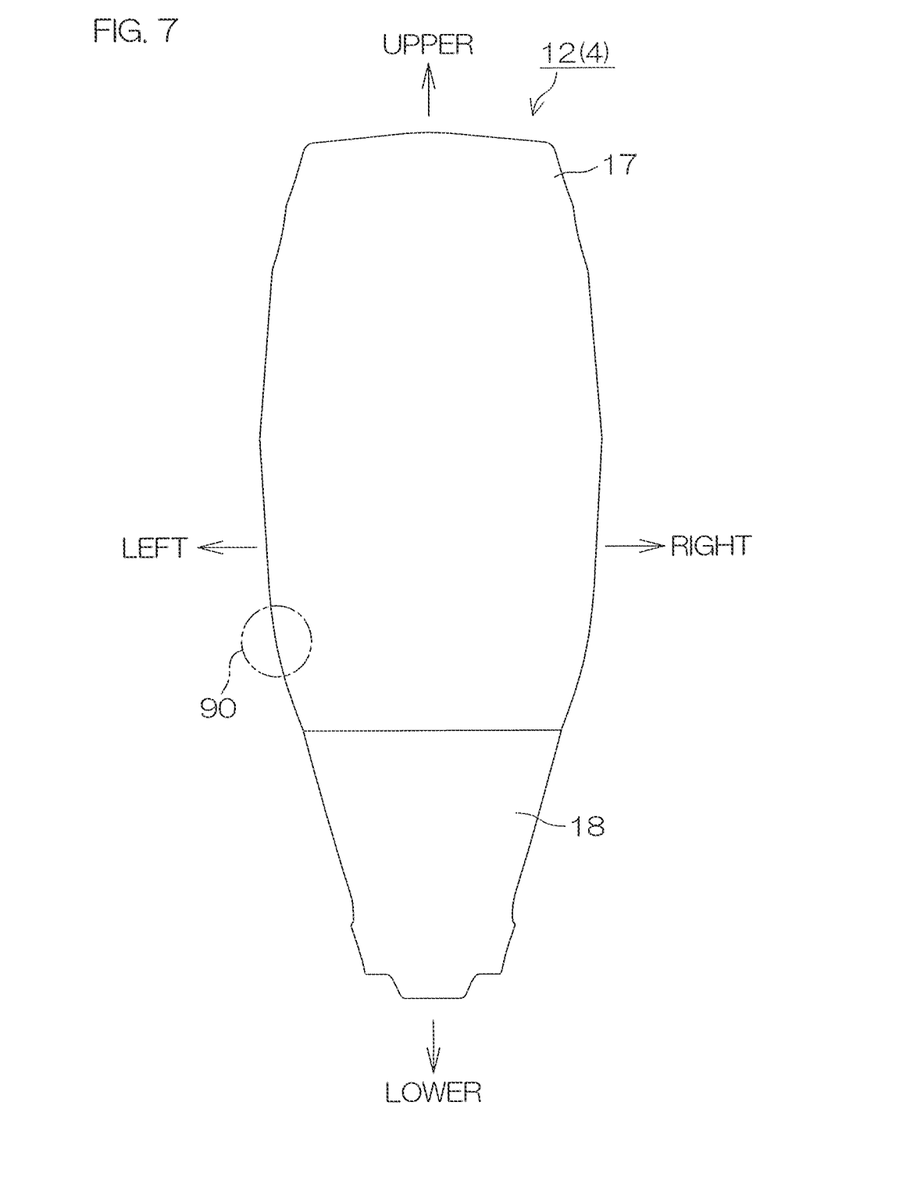
FIG. 7 is a rear view of the main portion of the outboard motor.

In the upstream exhaust pipe 81, the lower end portion 81A is located closer to the combustion chamber 28 than the upstream portion 81B, and therefore it is possible to locate a connector portion 89 between the lower end portion 81A of the upstream exhaust pipe 81 and the relay exhaust pipe 85 close to the combustion chamber 28. This makes it possible to prevent the connector portion 89 from protruding outwardly from the outboard motor 4 in the left-right direction. In this case, it is possible to prevent a portion 90 (see FIG. 7), which is near or adjacent to the connector portion 89, of the engine cover 17 from protruding outwardly from the outboard motor 4 in the left-right direction, thus making it possible to make the outboard motor 4 compact in the left-right direction. Therefore, in a case in which a plurality of outboard motors 4 are arranged side by side in the left-right direction and are mounted on the vessel 1, it is possible to prevent interference between the adjacent outboard motors 4.

The rotor 57 is located above the engine 20 as described above, and not below the engine 20. This makes it possible to secure the space 91, which is used to locate the lower end portion 81A of the upstream exhaust pipe 81 closer to the combustion chamber 28 than the upstream portion 81B, below the engine 20.

The upstream portion 81B of the upstream exhaust pipe 81 extends linearly downwardly, and therefore air that downwardly flows in the upstream portion 81B is able to reach the lower end portion 81A of the upstream exhaust pipe 81 substantially without changing its direction (see the thick solid arrow X1 in FIG. 6). Additionally, the lower end portion 81A of the upstream exhaust pipe 81 is connected to the relay exhaust pipe 85 from above, and therefore exhaust gases that have flowed downwardly and have reached the lower end portion 81A of the exhaust passage are able to flow into the relay exhaust pipe 85 along the shortest path substantially without changing their direction (see the thick solid arrow X2 in FIG. 6). This enables exhaust gases to flow smoothly toward the relay exhaust pipe 85 from the upstream exhaust pipe 81, thus making it possible to reduce or prevent exhaust pressure loss in the engine 20. In an arrangement in which an amount of exhaust gases becomes comparatively large by providing the pressure charger 50 as in the present preferred embodiment, the benefit obtained by reducing or preventing exhaust pressure loss is particularly great.

In the present preferred embodiment, all of the plurality of exhaust ports 54 are connected to the upstream portion 81B. With this arrangement, it is possible to enable exhaust gases generated in all of the combustion chambers 28 to smoothly flow from the upstream exhaust pipe 81 toward the relay exhaust pipe 85, and therefore it is possible to reduce or prevent exhaust pressure loss in the engine 20 more advantageously. Additionally, it is possible to secure the space 84 used to locate the cam chain 35.

In the present preferred embodiment, a first region 81C, which is farther away from the combustion chamber 28 than a central axis V of the upstream exhaust pipe 81, of the inner surface of the upstream portion 81B and a second region 81D, which is farther away from the combustion chamber 28 than the central axis V, of the inner surface of the lower end portion 81A are flush or substantially flush with each other. The central axis V is a virtual line passing through the center of an inner surface 541 of the upstream exhaust pipe 81 (center of a flow-passage cross section of the upstream exhaust pipe 81). The adjacent region 81K is located opposite to the first region 81C with the central axis V interposed therebetween.

With this arrangement, exhaust gas in the upstream exhaust pipe 81 is able to downwardly flow along the first region 81C of the upstream portion 81B and along the second region 81D of the lower end portion 81A, and thus able to reach the lower end portion 81A substantially without changing its direction (see the thick solid arrows X1 and X2 in FIG. 6). Therefore, it is possible to reduce or prevent exhaust pressure loss in the engine 20 more advantageously.

The flow rate becomes larger in proportion to a downward flow in the upstream exhaust pipe 81 because of the fact that exhaust gases emitted from each of the exhaust ports 54 merge together, and therefore an upper portion 81CA, which has a comparatively small flow rate, of the first region 81C may be more inclined toward the combustion chamber 28 in proportion to an upward flow. On the other hand, a third region 81E, which is closer to the combustion chamber 28, of the inner surface of the upstream portion 81B curves rightwardly and then extends linearly downwardly. In accordance with this, the central axis V extends along the up-down direction in the upstream portion 81B, and yet the central axis V downwardly extends in a state of being slightly deviated rightwardly in the lower end portion 81A.

Additionally, the cross-sectional area of the flow passage of the upstream exhaust pipe 81 is invariable or substantially invariable with respect to the upstream portion 81B and the lower end portion 81A, and therefore it is possible to reduce or prevent exhaust pressure loss in the engine 20 even more advantageously. The cross section of the flow passage of the lower end portion 81A may be elongated in, for example, the left-right direction in order to equalize the cross-sectional area of the flow passage of the upstream portion 81B and the cross-sectional area of the flow passage of the lower end portion 81A with each other.

Additionally, a portion, to which the lower end portion 81A of the upstream exhaust pipe 81 is connected, of the relay exhaust pipe 85 includes a dual structure provided by the inner pipe 85A and the outer pipe 85B, and therefore the connector portion 89 between the lower end portion 81A of the upstream exhaust pipe 81 and the relay exhaust pipe 85 is thickened. However, it is possible to prevent the connector portion 89 from protruding outwardly from the outboard motor 4 in the left-right direction by locating the connector portion 89 close to the combustion chamber 28 as described above, and therefore the outboard motor 4 is able to be compact in the left-right direction even if the relay exhaust pipe 85 having a dual structure is used.

Various features described above may be appropriately combined together.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An outboard motor comprising:
an engine including a plurality of cylinders arranged in series along a vertical direction and each including a combustion chamber, a plurality of exhaust ports respectively extending from the combustion chambers of the plurality of cylinders in a sideward direction, and an upstream exhaust pipe connected to the plurality of exhaust ports and extending downwardly, the upstream exhaust pipe including a lower end portion and an upstream portion located at a higher location than the lower end portion and extending linearly downwardly;

a relay exhaust pipe to which the lower end portion of the upstream exhaust pipe is connected from above;
a downstream exhaust pipe connected to the relay exhaust pipe; and
a propeller to be driven by the engine; wherein
the lower end portion of the upstream exhaust pipe is located closer to the combustion chamber than the upstream portion of the upstream exhaust pipe with respect to a left-right direction.

2. The outboard motor according to claim 1, wherein all of the plurality of exhaust ports are connected to the upstream portion of the upstream exhaust pipe.

3. The outboard motor according to claim 1, wherein
the engine includes a camshaft operable to intake/exhaust air in the combustion chamber and a cam chain located below the plurality of cylinders to rotate the camshaft; and
the upstream portion of the upstream exhaust pipe is located at a more sideward location than the cam chain, and at least a portion of the lower end portion of the upstream exhaust pipe is located directly under the cam chain.

4. The outboard motor according to claim 1, wherein
an inner surface of the upstream portion of the upstream exhaust pipe includes a first region that is farther away from the combustion chamber than a central axis of the upstream exhaust pipe;
an inner surface of the lower end portion of the upstream exhaust pipe includes a second region that is farther away from the combustion chamber than the central axis; and
the first region and the second region are flush or substantially flush with each other.

5. The outboard motor according to claim 1, wherein the engine includes a cylinder head including the plurality of exhaust ports and integral with the upstream exhaust pipe.

6. The outboard motor according to claim 1, wherein
the relay exhaust pipe includes an inner pipe into which the lower end portion of the upstream exhaust pipe is inserted and an outer pipe surrounding the inner pipe; and
a flow passage in which cooling water flows is defined between the inner pipe and the outer pipe.

7. The outboard motor according to claim 1 further comprising:
a pressure charger; wherein
the engine includes an air intake passage connected to the combustion chamber, a crankshaft extending along a vertical direction, and a rotor attached to an upper end portion of the crankshaft to rotate together with the crankshaft; and
the pressure charger is operable to be driven by transmission of rotation of the rotor to compress air flowing through the air intake passage.

\* \* \* \* \*